UNITED STATES PATENT OFFICE.

JOHN COLLINS CLANCY, OF COLORADO SPRINGS, COLORADO, ASSIGNOR OF FIFTY-ONE ONE-HUNDREDTHS TO PORTLAND GOLD MINING COMPANY, OF COLORADO SPRINGS, COLORADO, A CORPORATION OF WYOMING.

MAKING OF ALKALI CYANOGEN COMPOUNDS.

1,112,893.   Specification of Letters Patent.   Patented Oct. 6, 1914.

No Drawing.   Application filed June 22, 1912. Serial No. 705,173.

*To all whom it may concern:*

Be it known that I, JOHN COLLINS CLANCY, a subject of the King of Great Britain, having declared my intention of becoming a citizen of the United States, at present residing at Colorado Springs, in the county of El Paso and State of Colorado, have invented certain new and useful Improvements in the Making of Alkali Cyanogen Compounds, of which the following is a specification.

My invention relates to novel methods of making cyanids from commercial cyanamid, which methods are particularly described and pointed out in the following specifications and claims.

It is a known fact that cyanids may be derived from commercial cyanamid by fusing it with sodium chlorid, sodium carbonate or potassium carbonate at a high temperature. Owing to the large percentage of lime and other impurities contained in commercial cyanamid, the fusing of this compound is rendered difficult unless a very large proportion of flux is used. The salt which gives the largest yield of cyanid when heated with cyanamid in presence of carbon—is, potassium carbonate. The use of potassium carbonate in this way for the commercial production of potassium cyanid from cyanamid is absolutely prohibitive on account of its present cost. Inventors have discovered that in this, like in all other cases, the effect of fusing cyanamid with sodium chlorid or sodium carbonate results in failure, i. e. the high temperature necessarily employed, the yield is so small that the employment of these methods renders its commercial production prohibitive on account of cost.

It has been suggested before, (*i. e.* in U. S. patent specification #708,333) to heat the crude cyanamid with the addition of salt to a high temperature, the cyanamid being converted into cyanid as follows:

$$CaCN_2 + C = Ca(CN)_2$$

But, nowhere has the peculiar action been observed which is produced when an alkaline sulfid, such, for example, sodium sulfid is used in combination with a halogen salt, *i. e.* sodium chlorid. The time required for the formation of cyanid by this means is reduced to a few minutes, and in no case is actual fusing or melting required, and it is a remarkable fact that only a small quantity of the alkline sulfid is sufficient to produce the desired successful result. At first, it might be supposed that the use of sodium sulfid used in this manner will bring about the formation of sulfocyanid. This conjecture is correct, as the formation of sulfocyanids depends upon the temperature, the proportion and kind of carbon used. However, if a mixture of cyanamid and sodium sulfid together with pulverized coal be heated quickly to a temperature of say somewhere between 800 to 1000° C.—no formation of sulfocyanids takes place, and the conversion of cyanamid into cyanid is practically complete.

I have found that if equal weights of sodium sulfid and cyanamid are heated with a proportion of carbon equal to one-fifth weight of the cyanamid taken to a temperature of from about 800 to 1000° C.—alkaline cyanid was formed to the extent of 25% of the weight of the cyanamid taken. The resulting product was contaminated with a large amount of soluble sulfids. On considerably increasing the proportion of carbon the yield of cyanid was not increased. On the other hand if equal weights of cyanamid and sodium sulfid were heated to the same temperature with the same proportion of carbon in the form of soft coal (hydrocarbon) the yield of cyanid was increased to 55% of the weight of cyanamid taken; this product was also contaminated with a large amount of soluble sulfids. These soluble sulfids would mitigate against its use as a solvent for gold and would require extra treatment to eliminate soluble sulfids.

After numerous experiments I discovered that it was possible to obtain a product free from soluble sulfids containing a high percentage of cyanid, and at once readily applicable in a commercial way for use in the treatment of gold and silver ores. This result was accomplished by heating cyanamid with an equal weight of a mixture consisting of 50% sodium sulfid and 50% sodium chlorid with the addition of pulverized coal in proportion to one-fifth the weight of cyanamid taken.

The nature of the action between sodium sulfid, calcium cyanamid and carbon is easily explained by assuming the following equation:

$$CaCN_2 + Na_2S + C = 2NaCN + CaS$$

The nature of the action between the sodium sulfid in conjunction with the sodium chlorid and nascent carbon upon the cyanamid is difficult to explain; it may be that a passing combination takes place between the sodiums of the sodium chlorid and the sodium sulfid in presence of nascent carbon resulting in the formation of an insoluble salt, $CaCl_2, CaS$ after the equation:

$$2NaCl + Na_2S + 2CaCN_2 + 2C = CaCl_2, CaS + 4NaCN$$

Practical experiments have produced the following results: 1. 10 grams of calcium cyanamid mixed with 5 grams sodium sulfid, 5 grams sodium chlorid and 2 grams of pulverized coal heated to a temperature of from about 800 to 1000° C. with the exclusion of air gave a yield of cyanid equivalent to 55% of the weight of cyanamid taken. This mixture when dissolved in water gave no test for soluble sulfids, the solution being very active on gold leaf. On the other hand 10 grams of calcium cyanamid mixed with 10 grams of sodium sulfid and 2 grams of pulverized coal heated to a temperature of from about 800 to 1000° C. with exclusion of air gave a yield of cyanid equivalent to 55% of the weight of cyanamid taken. This mixture when dissolved in water gave a very large amount of soluble sulfids and this solution showed no action upon gold leaf even after standing ten days. Although cyanid was present no action upon the gold leaf would take place until all the sulfids were oxidized. This product would in all probability be useless as a gold solvent unless the sulfids were oxidized before or during treatment of the ore. Of course in cases where cyanid is not used for the purpose of ore treatment this means of producing cyanid from cyanamid might have its use.

In carrying my process into practice the finely ground cyanamid is thoroughly mixed with the finely divided sodium sulfid and sodium chlorid together with pulverized coal and heated in a crucible or a furnace with exclusion of air to a temperature of from about 800 to 1000° C. As soon as the volatile products cease to be given off, which in practice generally takes about fifteen or twenty minutes after the mixture has been brought to a good red heat; the crucible or container is removed from the source of heat or the source of heat removed from the container. The mixture is then allowed to cool with exclusion of air. The contents of the container now contains cyanid in the form of sodium cyanid mixed of course with insoluble compounds already described.

Having now described my invention and examples of different ways of carrying into effect, it will be understood that various modifications and changes in the described processes may be made and equivalent substances may be employed without departing from the spirit of my invention and without exceeding the scope of my claim.

The term "carbonaceous material" as employed in the claims is used to denote the hydrocarbons or other carbon-containing material capable of yielding carbon in the process of treatment described, such as hard and soft coal.

What I claim and desire to procure by Letters Patent is:

1. The process of producing cyanogen compounds which consists in heating calcium cyanamid with alkali-metal sulfid in presence of a carbonaceous material at reacting temperatures.

2. The process of producing cyanogen compounds which consists in heating calcium cyanamid with its own weight of a mixture composed of equal weights of sodium sulfid and an alkali-metal salt in presence of carbonaceous material at reacting temperatures.

3. The process of producing cyanogen compounds which consists in heating calcium cyanamid with its own weight of a mixture composed of equal weights of sodium sulfid and sodium chlorid in presence of carbonaceous material at reacting temperatures.

JOHN COLLINS CLANCY.

Witnesses:
W. A. HILLER,
E. F. DRAPER.